United States Patent
Frotz et al.

(10) Patent No.: US 9,022,467 B2
(45) Date of Patent: May 5, 2015

(54) HEAD RESTRAINT FOR A VEHICLE SEAT

(75) Inventors: Thomas Frotz, Burscheid (DE); Denis Quandt, Köln-Dünnwald (DE)

(73) Assignee: Johnson Controls GmbH, Burscheid (DE)

( * ) Notice: Subject to any disclaimer, the term of this patent is extended or adjusted under 35 U.S.C. 154(b) by 182 days.

(21) Appl. No.: 13/703,302

(22) PCT Filed: Jun. 10, 2011

(86) PCT No.: PCT/EP2011/002846
§ 371 (c)(1),
(2), (4) Date: Feb. 15, 2013

(87) PCT Pub. No.: WO2011/154150
PCT Pub. Date: Dec. 15, 2011

(65) Prior Publication Data
US 2013/0200667 A1  Aug. 8, 2013

(30) Foreign Application Priority Data

Jun. 11, 2010  (DE) .......................... 10 2010 023 404

(51) Int. Cl.
*B60N 2/48*  (2006.01)
*B60N 2/42*  (2006.01)

(52) U.S. Cl.
CPC ............ *B60N 2/4864* (2013.01); *B60N 2/4885* (2013.01)

(58) Field of Classification Search
CPC .......................... B60N 2/4885; B60N 2/4864
USPC ........................................... 297/216.12, 391
See application file for complete search history.

(56) References Cited

U.S. PATENT DOCUMENTS

| 6,513,871 | B2 * | 2/2003 | Bartels | 297/216.12 |
| 6,688,697 | B2 * | 2/2004 | Baumann et al. | 297/391 |
| 6,957,858 | B2 * | 10/2005 | Yetukuri et al. | 297/216.12 |
| 2003/0151279 | A1 * | 8/2003 | Fowler | 297/216.12 |
| 2005/0077762 | A1 * | 4/2005 | Kraemer et al. | 297/216.12 |
| 2006/0250001 | A1 * | 11/2006 | Becker et al. | 297/216.12 |

(Continued)

FOREIGN PATENT DOCUMENTS

| CN | 101410272 A | 4/2009 |
| DE | 39 00 495 A1 | 7/1990 |
| DE | 199 23 909 A1 | 1/2000 |

(Continued)

OTHER PUBLICATIONS

International Search Report received in PCT/EP2011/002846 dated Oct. 28, 2011.

(Continued)

*Primary Examiner* — Milton Nelson, Jr.
(74) *Attorney, Agent, or Firm* — Foley & Lardner LLP

(57) ABSTRACT

A head restraint for a vehicle seat is provided, wherein at least one first part facing the head of the seat occupant can be moved linearly in the direction of the head of a seat occupant, wherein during the relocating motion, a relative motion between the first part and a second part of the head restraint arranged on a third part occurs, and a contact surface of the first part lies against a contact surface of the second part, and a contact surface is provided with a form-fit element, in particular a toothing arrangement. A method is provided for adjusting a head restraint.

11 Claims, 7 Drawing Sheets

(56) References Cited

U.S. PATENT DOCUMENTS

2007/0246989 A1* 10/2007 Brockman .................... 297/391
2011/0272977 A1* 11/2011 Froese et al. ............. 297/216.12

FOREIGN PATENT DOCUMENTS

| DE | 199 41 712 C1 | 10/2000 |
| DE | 10 2004 016 474 B3 | 8/2005 |
| DE | 10 2008 012 217 A1 | 5/2009 |
| WO | WO-2007/112568 A1 | 10/2007 |

OTHER PUBLICATIONS

English translation of the International Preliminary Report on Patentability received in connection with international application No. PCT/EP2011/002846; dtd Dec. 27, 2012.

Office Action in corresponding Chinese Application No. 201180036512.8 dated Oct. 29, 2014, 5 pages.

* cited by examiner

HEAD RESTRAINT FOR A VEHICLE SEAT

CROSS REFERENCE TO RELATED APPLICATIONS

The present application is a National Stage of International Application No. PCT/EP2011/002846 filed on Jun. 10, 2011, which claims the benefit of German Patent Application No. 10 2010 023 404.4 filed on Jun. 11, 2010. The entire disclosures of which are incorporated herein by reference.

The invention relates to a head restraint for a vehicle seat, in which at least a first partial piece facing the head of the seat occupant can be displaced linearly in the direction of the head of a seat occupant, a relative movement taking place during the displacement movement between the first partial piece and a second partial piece of the head restraint arranged on a third partial piece and an abutment face of the first partial piece abutting an abutment face of the second partial piece and an abutment face being provided with a positive-locking means, in particular a tooth arrangement. The present invention further relates to a method for adjusting a head restraint.

The publication DE 199 23 909 A1 discloses a head restraint which comprises a base member which is connected to the backrest of the vehicle seat by means of retention rods in a rigid and optionally also height-adjustable manner and which is arranged in an upholstery segment which is constructed in a tank-like manner. In the event of an accident, the upholstery segment is moved in translation toward the head of the seat occupant in order to prevent whiplash-type injury. The force necessary for this purpose is produced by a spring which is biased in the displacement direction inside a telescope-like guide device. Offenlegungsschrift DE 39 00 495 A1 discloses another head restraint in which an upholstery segment can be pivoted forward about a fixed axis of rotation relative to the base member in the event of an accident. A spring-loaded piston/cylinder arrangement acts as a drive device in conjunction with a support lever, wherein the piston rod is articulated to the base member in the region of the axis of rotation and the cylinder is articulated to the upholstery segment. The publication DE 199 41 712 C1 further discloses a head restraint in which a displaceable upholstery element is connected to the base member via a scissors-type mechanism, by means of which the upholstery element can be moved out of a rest position forward into a position for use. A head restraint according to the preamble of claim 1 is known from the publication DE 10 2004 016 474 B3. In this instance, partial pieces of the head restraint are moved apart from each other in a telescope-like manner in order to take up a safety position of the head restraint. In particular, the head abutment faces which can be adjusted manually in order to increase comfort have the disadvantage that the adjustment is often connected with generation of noise.

An object of the invention is to provide a head restraint by a method for adjusting a head restraint which does not have the disadvantages of the prior art.

The object is achieved with a head restraint for a vehicle seat, in which at least a first partial piece facing the head of the seat occupant can be displaced linearly in the direction of the head of a seat occupant and back, a relative movement taking place during the displacement movement between the first partial piece and a second partial piece of the head restraint arranged on a third partial piece and an abutment face of the first partial piece abutting an abutment face of the second partial piece and an abutment face being provided with a positive-locking means, in particular a tooth arrangement. There is now provision according to the invention for a radial angle >0° and <90° to be provided at least partially between a plane which is arranged perpendicularly relative to the displacement direction and the positive-locking means.

The present invention relates to a head restraint which is arranged on the backrest of a vehicle seat. Such a vehicle seat may provide space for one or more persons. The vehicle seat according to the invention may also be a bench-type seat. According to the invention, that head restraint has a first partial piece which is generally upholstered and which can be displaced by a linear extent in the direction of the head of the seat occupant and back. The displacement may be carried out in order to adjust comfort or in order to reduce injuries to the head and/or neck in the event of a rear-end collision. According to the invention, the head restraint has a second partial piece which is arranged, for example, rotatably arranged, on a third partial piece. The third partial piece is generally a base member, to which the retention rod(s) of the head restraint is/are connected. In order to displace the first portion toward or away from the head of the seat occupant, a relative movement is brought about between the first and the second partial piece. This particularly involves a rotational movement. According to the invention, an abutment face of the first partial piece further abuts an abutment face of the second partial piece. During the relative movement of the first and second partial piece, the abutment faces also move relative to each other. The partial pieces preferably each have a cylindrical cross-section at least in portions. The abutment faces preferably wind round that cylindrical cross-section in portions with a given pitch. Consequently, they are in the form of a partial piece of a helix. In a particularly preferred manner, each partial piece has two abutment faces which are arranged diametrically opposite each other. The first partial piece is moved forward and backward owing to the relative movement of the abutment faces in relation to each other. The abutment face of one partial piece is preferably fixed in position and only the other abutment face moves and preferably slides along an abutment face. According to the invention, one abutment face has positive-locking means, for example, teeth, in particular saw teeth. The positive-locking means particularly serve to prevent relative movement between the two partial pieces, that is to say, to fix the first partial piece in a specific position.

According to the invention, there is provision for a radial angle >0° and <90° to be provided at least partially between the plane which is arranged perpendicularly relative to the displacement direction and the positive-locking means. Consequently, the positive-locking means has an angle of incidence in a radial direction. Consequently, the positive-locking means is preferably inclined in the direction of the head of the seat occupant. The inclination of the positive-locking means has the advantage that release of the positive-locking means, for example, from a locking means, is carried out substantially more quickly and thereby more quietly and with less wear.

The radial angle is preferably >30°, particularly preferably between 40 and 50° and very particularly preferably 45°. The radial angle is preferably constant over the entire width and length of the abutment face.

The explanations set out in relation to this subject-matter of the invention apply similarly to other aspects of subject-matter of the present invention, and vice versa.

According to another or a preferred subject-matter of the present invention, the head restraint has a locking means which prevents the first partial piece and the second partial piece from moving relative to each other, the locking means becoming resiliently deformed in order to release the locking action. Consequently, there is provision according to the invention for the locking means to become resiliently bent at least partially in order to release a positive-locking connection which is provided between the locking means and the first or second partial piece. Positive-locking means provided on the locking means become disengaged from the engagement with positive-locking means which are provided on one of the partial pieces. In order to produce the positive-locking connection again, the locking means resiliently returns to its original position. The locking means is preferably bent in a radially outward direction for release.

The explanations set out in relation to this subject-matter of the invention apply similarly to other aspects of subject-matter of the present invention, and vice versa.

According to a preferred embodiment, the release of the locking action is carried out automatically as soon as a pulling action is applied to the first partial piece of the head restraint. Owing to that pulling movement, the positive-locking means of the locking means is automatically moved away from the positive-locking means, in particular of the first partial piece, whereby the locking thereof is disengaged. That unlocked position is retained until pressure is applied to the head restraint, in particular the first partial piece, for example, in the event of an accident and/or when the seat occupant places his head against the first partial piece of the head restraint. Only then does the locking means automatically engage back in its locking position. Further unlocking of the locking means may be brought about by further pulling until the first partial piece has reached its foremost position. If the first partial piece is intended to be moved from that position back into a position in which it is further removed from the head of the seat occupant, the locking action must be released in a manual or motorized manner.

According to another or a preferred subject-matter of the present invention, the locking means has a positive-locking means which can be brought into a locking or unlocking position by two different, non-overlapping movements.

The explanations set out in relation to this subject-matter of the invention apply similarly to other aspects of subject-matter of the present invention, and vice versa.

For example, the positive-locking means can be released both with a radial movement and with an axial movement from the positive-locking means of the first or second portion. Whereas the first movement, the radial movement, is carried out automatically as described above, the other movement is carried out in a motorized or manual manner. The positive-locking means is moved axially away from the first or second portion in a manual or motorized manner in order to release the locking action thereof.

The following explanations apply to all aspects of subject-matter of the present invention.

The positive-locking means of the locking means preferably has at least partially a radial angle which preferably corresponds to the radial angle of the positive-locking means of the first or second partial piece.

In a preferred embodiment of the present invention, the head restraint has a spacer means which deforms the positive-locking means of the locking means. The spacer means is preferably pressed between one of the two partial pieces and bends the positive-locking means of the locking means outward as soon as the first partial piece is moved in the direction of the head of the seat occupant.

The spacer means is preferably a roller member which is guided in a tapering path.

The present invention further relates to a method for adjusting a head restraint for a vehicle seat, in which at least a first partial piece facing the head of the seat occupant is displaced along a line in the direction of the head of a vehicle occupant, a relative movement taking place during the displacement movement between the first partial piece and a second partial piece (12) of the head restraint arranged on a third partial piece, and in which this relative movement drives a spacer means which partially deforms a locking means.

The explanations set out in relation to the head restraints according to the invention apply similarly to the method according to the invention, and vice versa.

Features from all the aspects of subject-matter of the present invention can be freely combined with each other.

The inventions are explained below with reference to FIGS. 1 to 6. These explanations are merely exemplary and do not limit the general inventive notion. The explanations apply similarly to all aspects of subject-matter of the invention.

Figure 1:
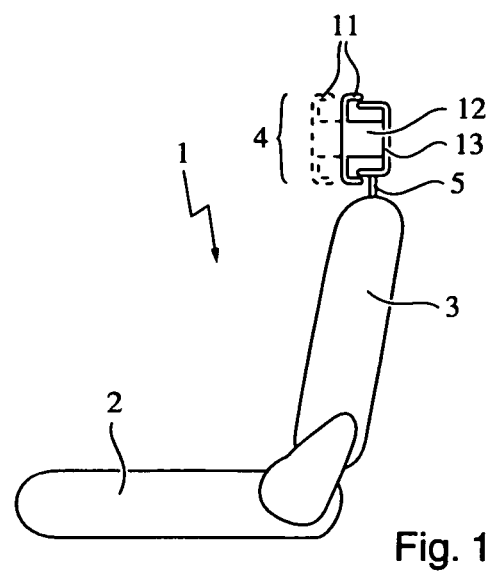
FIG. 1 shows a vehicle seat having a head restraint.

As can be seen in FIG. 1, a vehicle seat 1 according to the invention or a vehicle seat 1 provided with a head restraint 4 according to the invention comprises a seat member 2 and a backrest 3 which is connected thereto particularly in a manner adjustable in terms of inclination and which is provided with the head restraint 4. Retention rods 5, preferably in pairs, can be provided to fix the head restraint to the backrest 3. Alternatively, however, there may also be provided other fixing possibilities (not illustrated) between the backrest 3 and the head restraint 4. The pairs of retention rods 5 of the head restraint 4 can be connected to the backrest 3 or to the head restraint 4 in a pivotable manner in the upper region of the backrest 3 or in the region of the head restraint 4 via an articulation (not illustrated). According to the invention, the head restraint 4 has at least a first partial piece 11 of the head restraint 4, which partial piece 11 faces the head of the seat occupant and which can be displaced from a retracted position (indicated with a solid line in FIG. 1) toward the head of the seat occupant in a displacement direction into a front position (indicated with a broken line in FIG. 1) owing to an accident and/or in order to adjust comfort. The first partial piece 11 is particularly an upholstery element, on which the head of the seat occupant can be positioned or supported. The third partial piece of the head restraint is particularly a base member of the head restraint which is connected to the backrest 3 via the retention rods 5 in a rigid manner or also so as to be adjustable in terms of height and/or inclination. A drive device, which is described in detail below, which has the second partial piece 12 and which brings about the displacement of the first partial piece 11 in a movement direction C toward the head of the seat occupant is arranged inside the head restraint 4 between the first partial piece 11 and the third partial piece 13.

The relative movement of the partial pieces 11, 12, 13 of the head restraint 4 according to the invention is schematically illustrated in greater detail with reference to FIGS. 2a to 2d. In this instance, FIGS. 2a and 2b show the state of the head restraint in the retracted position and FIGS. 2c and 2d show the state of the head restraint in the advanced position (displacement of the first partial piece 11 in the direction toward the seat occupant, movement direction C), FIG. 2b being a front sectional view of the head restraint 4, which is depicted as a sectional side view in FIG. 2a, in accordance with the line of section X-X of FIG. 2a and FIG. 2d being a sectional front view of the head restraint 4, which is depicted as a sectional side view in FIG. 2c, in accordance with the line of section X-X of FIG. 2c.

Figure 2A:
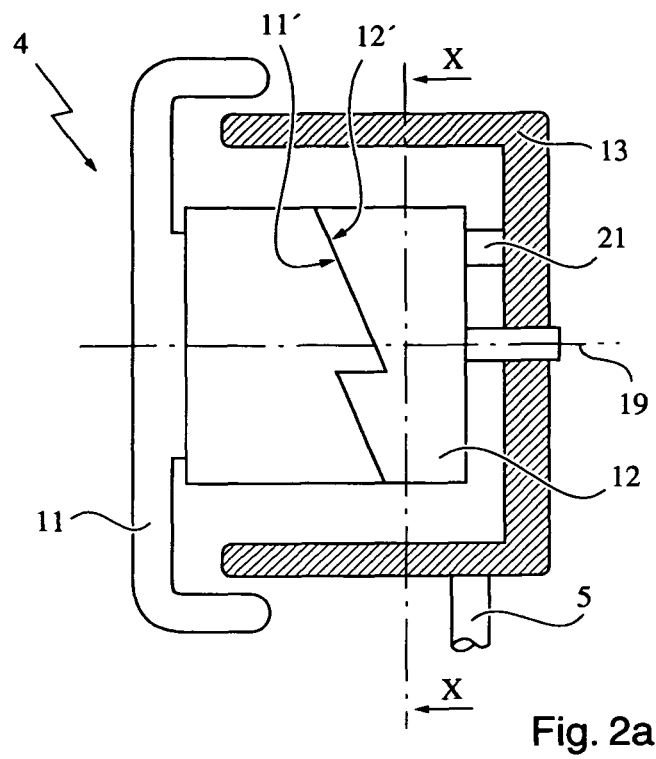
FIGS. 2a to 2d are sections through a drive device which can be used in the head restraint in various axial positions.
Figure 2B:
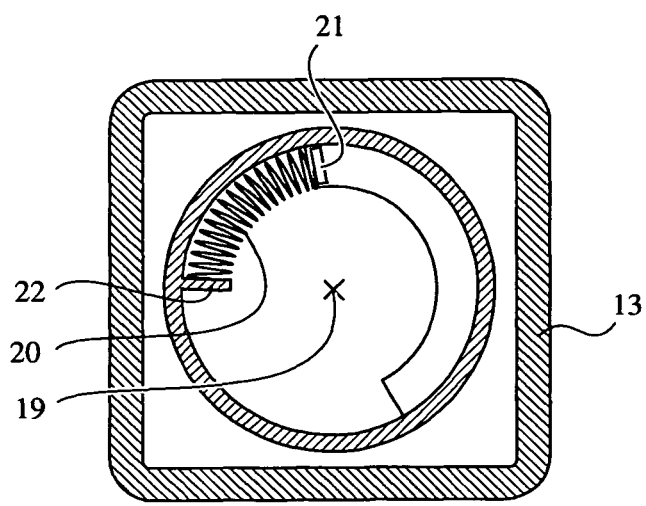
Figure 2C:
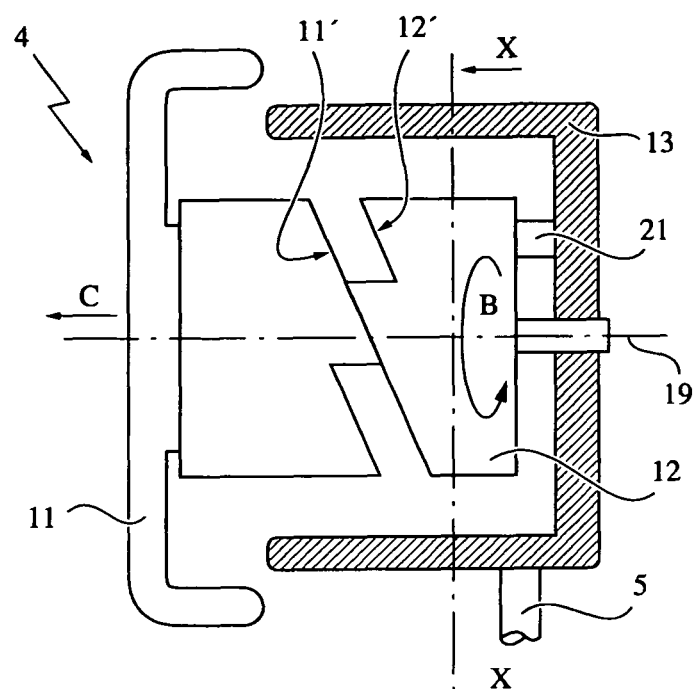
Figure 2D:
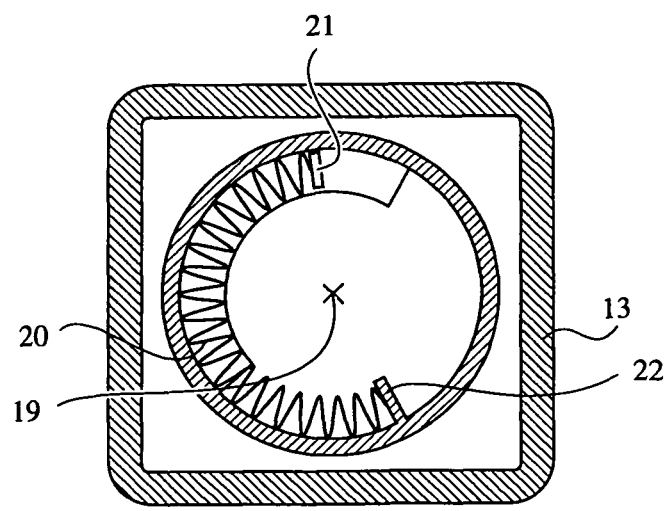

As can be seen in FIGS. 2a-d, the first and the second partial piece 11, 12 each have an abutment face 11', 12', in this instance the front faces, which are provided obliquely relative to the center axis 19 of the head restraint. The abutment faces 11, 12' abut each other and are pressed against each other with a given normal force by the resilient means 20 and the inclination of the abutment faces. Furthermore, the first partial piece 11 can be displaced linearly and the second partial piece 12 is rotatably provided in the third partial piece 13. The second partial piece 12 and the third partial piece 13 each have a stop 21, 22, between which a spring 20 is arranged. FIGS. 2a and 2b illustrate the head restraint in a state in which the first partial piece 11 is located in its position furthest from the head of the seat occupant. In this situation, the spring 20 has its maximum pretensioning. If the first partial piece 11 is pulled in order to adjust the comfort of the seat occupant, which is illustrated by the arrow C in FIGS. 2c and 2d, there is produced between the first partial piece 11 and the second partial piece 12 a gap which is closed in that the second partial piece, in a state driven by the spring 20, rotates about the axis 19. The oblique faces 11', 12' thereby constantly remain in abutment. The person skilled in the art understands that the abutment faces 11', 12' do not have to be front faces but that instead they can also be faces which are arranged at the periphery of the partial pieces 11, 12, which is illustrated in the following Figures. A movement of the partial piece away from the head of the seat occupant functions similarly. The second partial piece 12 is caused to rotate by the linear movement of the first partial piece 11 and pretensions the spring 20. The person skilled in the art understands that the displacement mechanism of the first portion 12 can also be constructed in a different manner.

Figure 3:
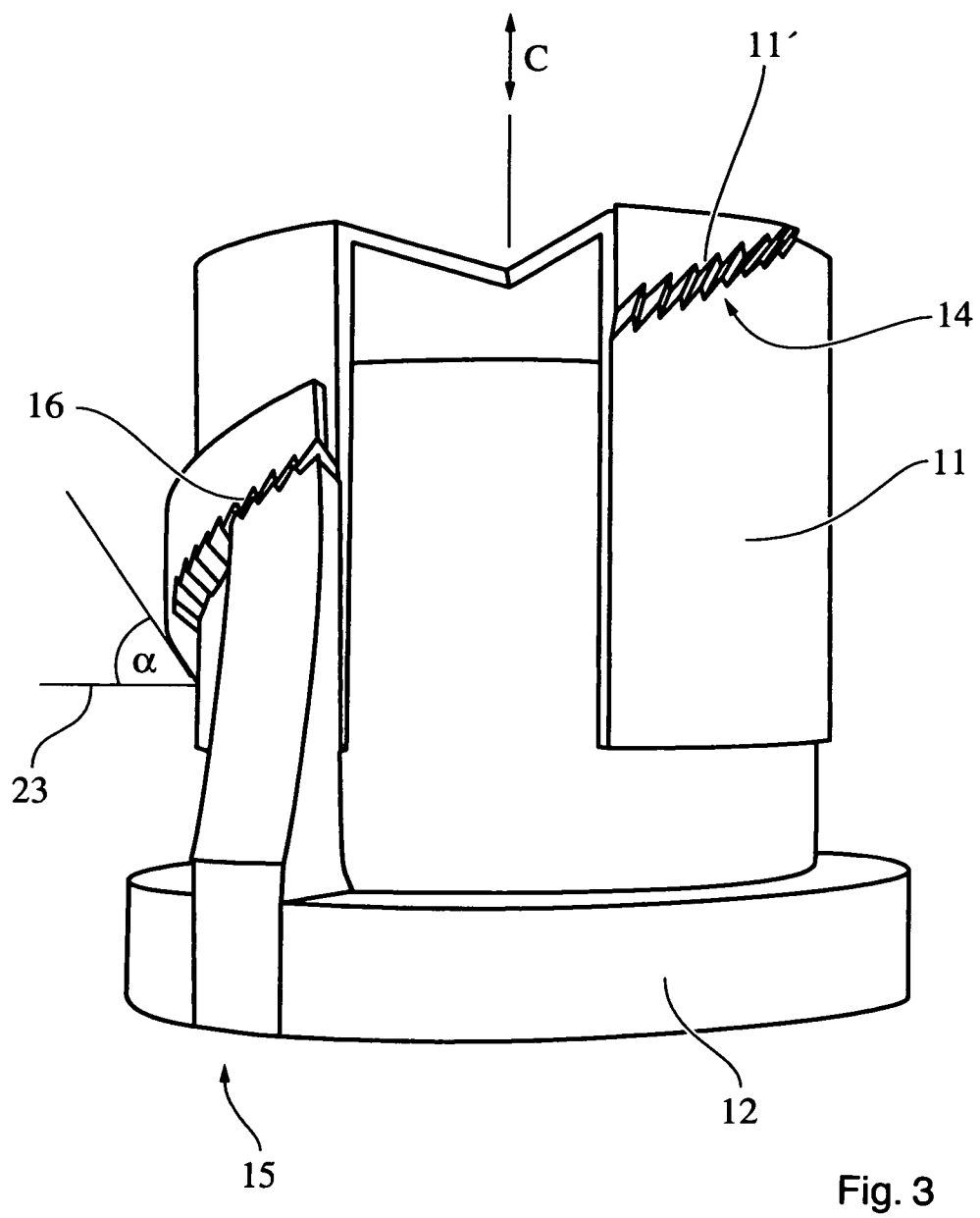
FIG. 3 shows a helix having outwardly inclined positive-locking means in the locked state.

In the embodiment according to FIG. 3, the abutment face 11' is arranged in a helix-like manner at the periphery of the first partial piece 11. It can be seen in FIG. 3 that the abutment face 11' of the first partial piece 11 has positive-locking means 14, in this instance a saw-tooth tooth arrangement. That positive-locking means 14 has, in relation to a plane 23 defined perpendicularly relative to the movement direction C, a radial angle α which in the present case is 45°. The radial angle α is not the pitch angle of the helix-like abutment face 11'. A locking means 15 which is wedge-like in at least one direction, preferably two directions, is arranged on the second partial piece 12 and has at the end thereof positive-locking means 16 which complement the positive-locking means 14 and which are also arranged at a radial angle α so that the teeth in the locked state abut each other as extensively as possible. The positive-locking means 16 of the locking means 15 are engaged with the positive-locking means 14 in the illustration according to FIG. 3 and thereby prevent the partial pieces 11, 12 from being able to rotate relative to each other. For reasons of clarity, the abutment face 12' has been omitted in this instance but would be arranged in a helical-like manner similarly to the abutment face 11' at the periphery of the partial piece 12. If the first partial piece 11 is pulled by the seat occupant away from the second partial piece 12 by a linear extent, the positive-locking means 11', 12' move out of engagement owing to that movement. Simultaneously or practically simultaneously, the partial piece 12 rotates about a given angular extent and a spacer means 17, in this instance a ball, is thereby moved between the periphery of the second partial piece 12 and the inner periphery of the spacer means and thereby bends the portion of the locking means 15, on which the positive-locking means 16 is arranged, resiliently outward. Consequently, the positive-locking means 16 at least partially carries out a radial movement away from the positive-locking means 14. That resilient deformation of the locking means is promoted inter alia in that the locking means 15 tapers in the direction of the positive-locking means 16, preferably in two directions. Owing to the axial displacement of the first partial piece 11, the radial movement of the positive-locking means 16 and the inclination of the positive-locking means 14, 16, those means move out of engagement very rapidly and therefore practically noiselessly and without any wear when the partial piece 11 is pulled.

Figure 4:
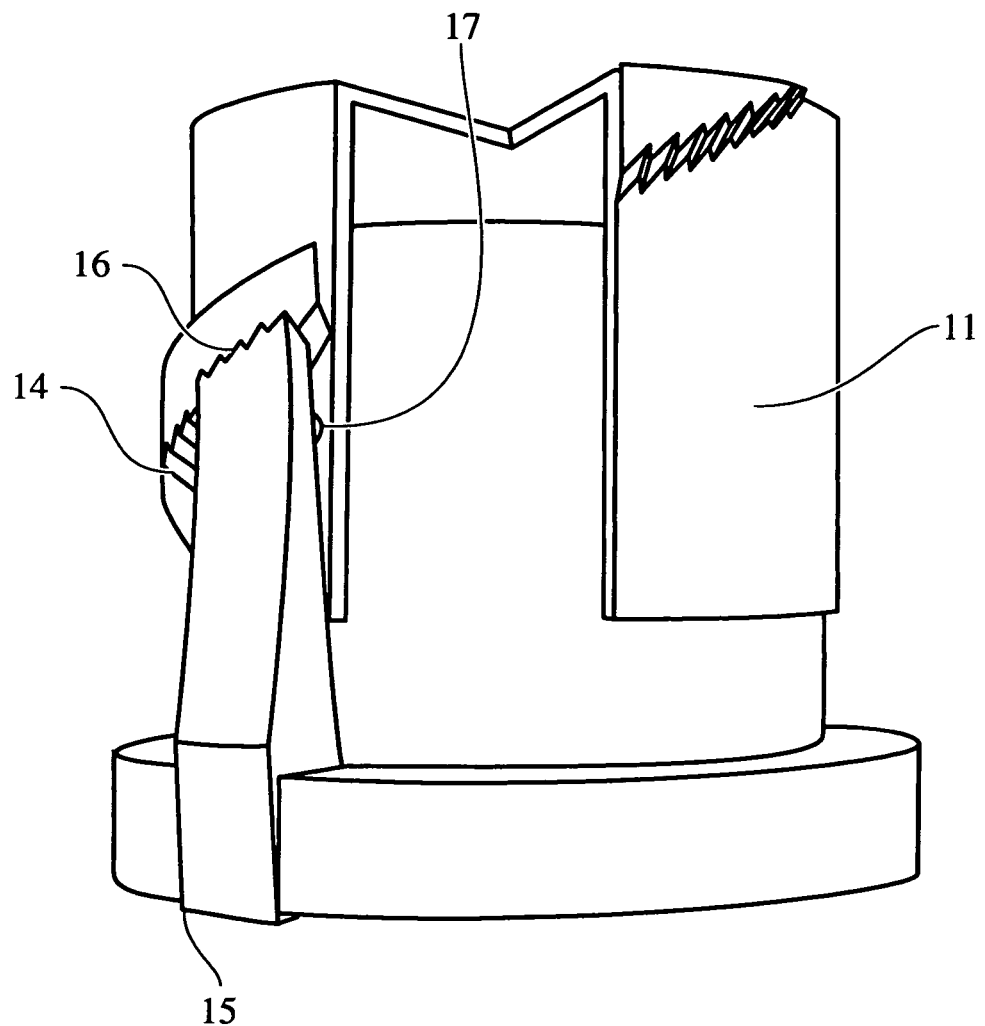
FIG. 4 shows the locking means having the spacer means.
Figure 5:
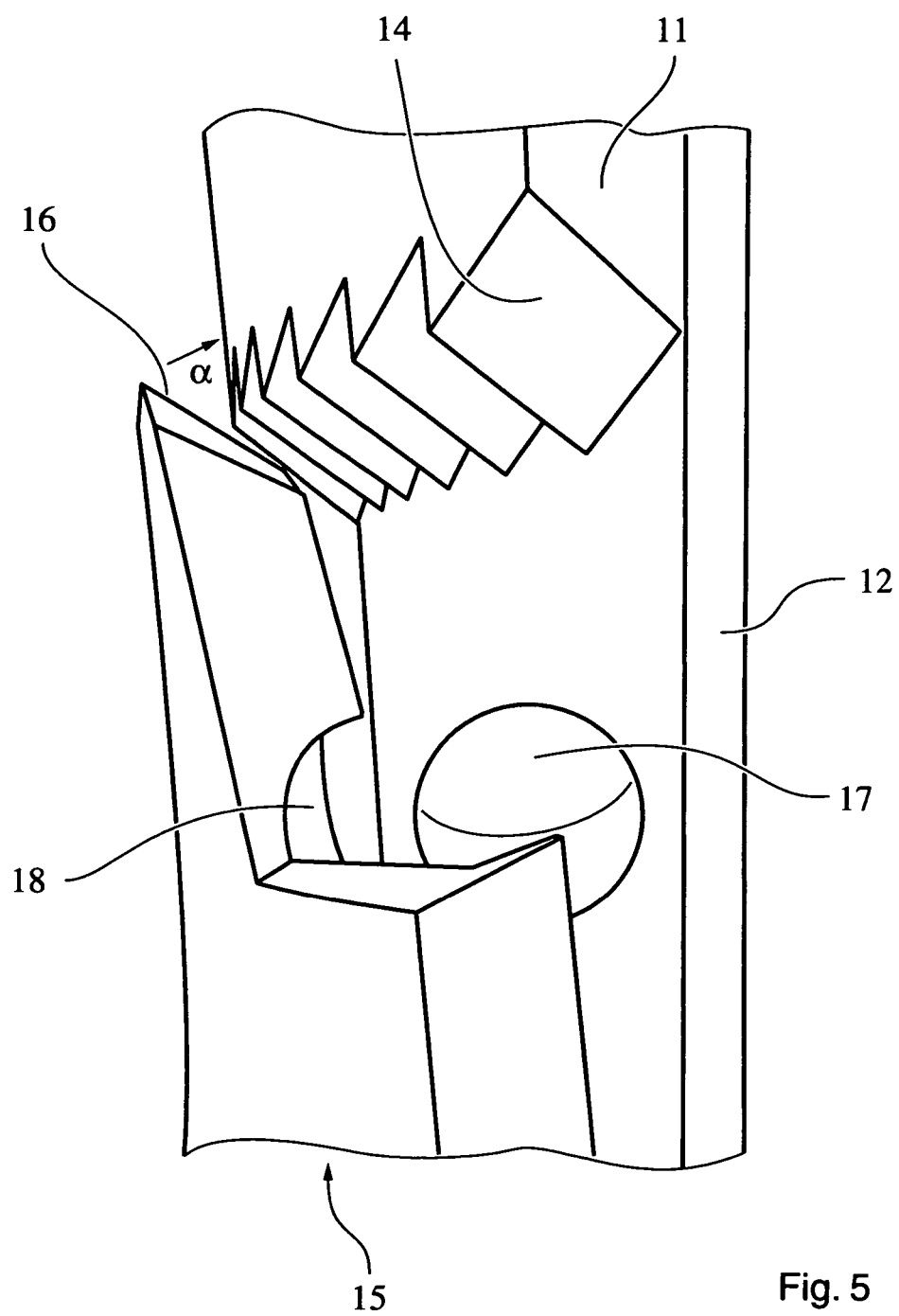
FIG. 5 shows a detail from FIG. 4.

FIG. 5 shows details of FIG. 4. The end of the locking means 15 which is bent radially outward and which has the positive-locking means 16 can be seen. It can further be seen that the positive-locking means 14, 16 are provided at a radial angle α. As can also be derived from FIG. 5, the resilient bending of the locking means 15 is carried out by a spacer means 17, in this instance a ball, it also being possible to use any other roller member or a plurality of roller members. The ball 17 is arranged in a receiving space 18, a receiving pocket, whose depth preferably decreases in the direction from right to left. In the left-hand position, the receiving space 18 provided in the locking means 15 completely receives the ball in such a manner that the locking means is not bent. During a rotation of the partial pieces 11, 12 relative to each other, and therefore a rotation of the first partial piece 11 and the locking means 15 relative to each other, the ball is rotated out of its left-hand position (position illustrated) and bends the locking means radially outward in portions. The ball 17 also remains in the position illustrated in FIG. 5 after the linear movement of the first partial piece has ended. However, as soon as pressure is applied to the first partial piece, whether it be owing to the abutment of the head of the seat occupant or owing to an accident, a minimal relative rotation occurs between the locking means 15 and the first partial piece 11 and the ball is displaced into the left-hand position thereof so that the positive-locking means 14, 16 are in engagement again. Both the locking and the unlocking are automatically carried out during a movement of the first partial piece 11.

Figure 6:
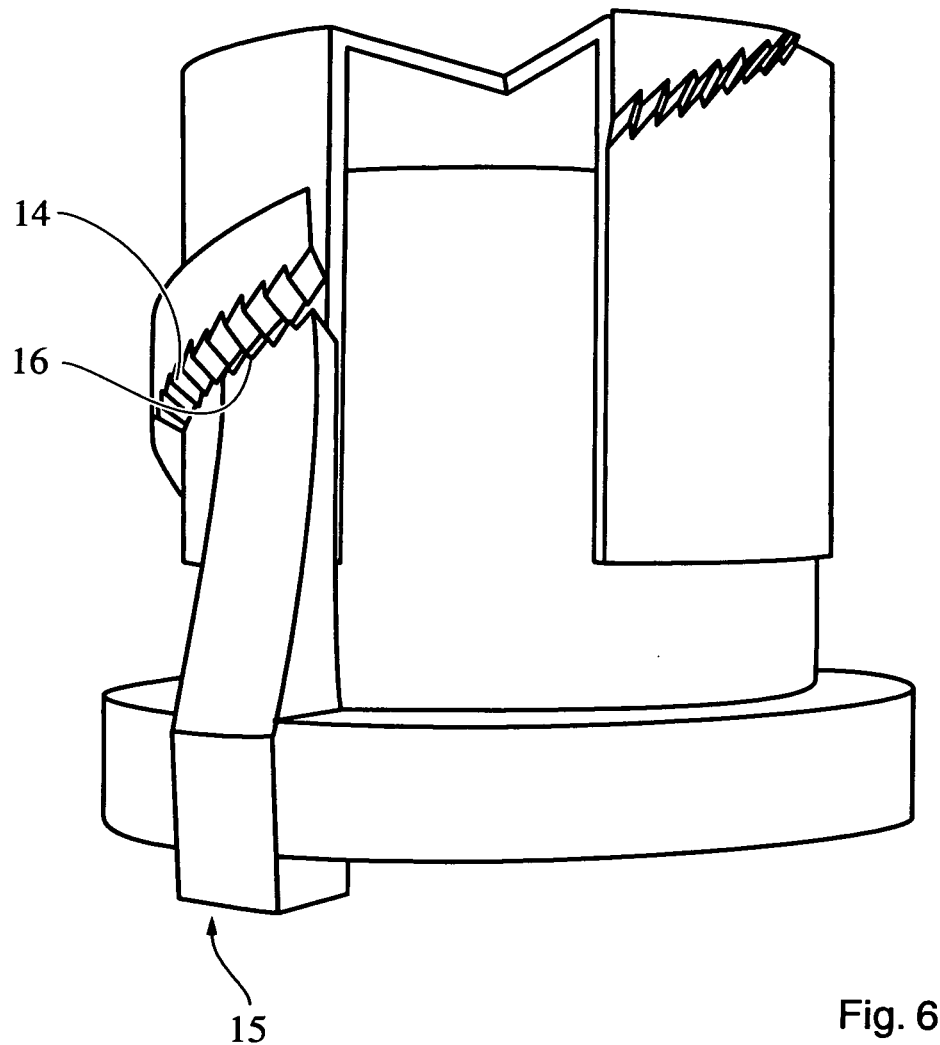
FIG. 6 shows manual unlocking of the locking means.

However, there are also situations in which the unlocking or locking is intended to be carried out without the first partial piece 11 being moved. For this case, the locking means has a mechanism, for example, a ball-point mechanism, which displaces it axially away from the positive-locking means 14. FIG. 6 shows the unlocked position of the locking means 15, in this instance the position unlocked by an axial movement of the locking means 15.

The invention claimed is:

1. A head restraint for a vehicle seat, in which at least a first partial piece, configured to face a head of a seat occupant, can be displaced along a line,
   a relative movement taking place during the displacement movement between the first partial piece and a second partial piece of the head restraint arranged on a third partial piece and a first abutment face of the first partial piece abutting a second abutment face of the second partial piece, wherein one of the first abutment face and the second abutment face is provided with a first positive-locking device that includes a tooth arrangement,
   wherein a radial angle (α)>0° and <90° is provided at least partially between a plane which is arranged perpendicularly relative to a displacement direction (C) and the first positive-locking device.

2. The head restraint as claimed in claim 1, wherein the radial angle is >30°.

3. The head restraint as claimed in claim 1, wherein the tooth arrangement is a saw-tooth tooth arrangement.

4. The head restraint as claimed in claim 1, further comprising a locking device which prevents the first partial piece and the second partial piece from moving relative to each other, wherein the locking device becomes deformed in order to release the locking action.

5. The head restraint as claimed claim 4, wherein the locking device has a second positive-locking device, and the second positive-locking device can be brought into a locking or unlocking position by two different, non-overlapping movements.

6. The head restraint as claimed in claim 5, wherein the second positive-locking device can be moved outward.

7. The head restraint as claimed in claim 5, wherein the axial position of the locking device can be changed.

8. The head restraint as claimed in claim 5, wherein the second positive-locking device has at least partially a radial angle ($\alpha$) which corresponds to the radial angle of the first positive-locking device.

9. The head restraint as claimed in claim 5, further comprising a spacer device which deforms the second positive-locking device of the locking device.

10. The head restraint as claimed in claim 9, wherein the spacer device is driven by a partial piece.

11. The head restraint as claimed in claim 9, wherein the spacer device is a roller member.

* * * * *